United States Patent [19]
Stilwell

[11] Patent Number: 5,105,435
[45] Date of Patent: Apr. 14, 1992

[54] METHOD AND APPARATUS FOR CANCELLING SPREAD-SPECTRUM NOISE

[75] Inventor: James H. Stilwell, Mesa, Ariz.

[73] Assignee: Motorola, Inc., Schaumburg, Ill.

[21] Appl. No.: 632,452

[22] Filed: Dec. 21, 1990

[51] Int. Cl.$^5$ ............................................. H04L 27/30
[52] U.S. Cl. ........................................ 375/1; 380/34;
370/18; 375/34; 375/102; 375/103; 455/284;
455/296; 455/305
[58] Field of Search ............... 375/1, 99, 102, 103,
375/34; 380/34; 455/278, 284, 296, 303, 305;
370/18

[56] References Cited

U.S. PATENT DOCUMENTS

| | | | |
|---|---|---|---|
| 3,374,435 | 3/1968 | Engel | 375/102 |
| 3,617,900 | 11/1971 | Fink et al. | 375/102 X |
| 3,667,050 | 5/1972 | Gibson | 375/102 X |
| 3,699,463 | 10/1972 | Stone | 375/102 X |
| 4,472,814 | 9/1984 | Gutleber | 375/1 X |
| 4,472,815 | 9/1984 | Gutleber | 375/1 X |
| 4,475,214 | 10/1984 | Gutleber | 375/34 |
| 4,475,215 | 10/1984 | Gutleber | 375/1 X |
| 4,914,676 | 4/1990 | Iwamatsu et al. | 375/102 |

FOREIGN PATENT DOCUMENTS 0147847 11/1980 Japan .................................. 375/102

OTHER PUBLICATIONS

"Spread Spectrum Multiple Access System with Intrasystem Interference Cancellation", by Tatsuro Masamura; The Transactions of the Institute of Electronics, Information and Communication Engineers, vol. E71, No. 3, (Mar. 1988), pp. 223-231.

Primary Examiner—Bernarr E. Gregory
Attorney, Agent, or Firm—Shawn Dempster

[57] ABSTRACT

A spread-spectrum noise canceller is provided for cancelling user code noise from a spread-spectrum communication channel. The spread-spectrum noise canceller including a receiver for receiving a spread-spectrum signal including a first and at least a second signal as well as a noise canceller operatively coupled to the receiver for reducing spread-spectrum noise in the first received signal by substantially processing the at least second received signal out of the received spread-spectrum signal.

In addition a method is provided which cancels user code noise from a spread-spectrum communication channel. The method includes for receiving a spread-spectrum signal including a first and at least a second signal and subsequently reducing spread-spectrum noise in the first received signal by substantially processing the at least second received signal out of the received spread-spectrum signal.

10 Claims, 3 Drawing Sheets

METHOD AND APPARATUS FOR CANCELLING SPREAD-SPECTRUM NOISE

FIELD OF THE INVENTION

The present invention relates to communication systems which employ spread-spectrum signals and, more particularly, to a method and apparatus for cancelling spread-spectrum noise in a communication channel.

BACKGROUND OF THE INVENTION

In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Two types of channels exist, namely, point-to-point channels and broadcast channels. Examples of point-to-point channels include wirelines (e.g., local telephone transmission), microwave links, and optical fibers. In contrast, broadcast channels provide a capability where many receiving stations may be reached simultaneously from a single transmitter (e.g. local television and radio stations).

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, and improved security of communication through the use of encryption.

These advantages are attained at the cost of increased transmission (channel) bandwidth and increased system complexity. Through the use of very large-scale integration (VLSI) technology a cost-effective way of building the hardware has been developed.

One digital transmission method that may be used for the transmission of message signals over a communication channel is pulse-code modulation (PCM). In PCM, the message signal is sampled, quantized, and then encoded. The sampling operation permits representation of the message signal by a sequence of samples taken at uniformly spaced instants of time. Quantization trims the amplitude of each sample to the nearest value selected from a finite set of representation levels. The combination of sampling and quantization permits the use of a code (e.g., binary code) for the transmission of a message signal. Other forms of digital transmission use similar methods to transmit message signals over a communication channel.

When message signals are digitally transmitted over a band-limited channel, a form of interference known as intersymbol interference may result. The effect of intersymbol interference, if left uncontrolled, is to severely limit the rate at which digital data may be transmitted without error over the channel. The cure for controlling the effects of intersymbol interference may be controlled by carefully shaping the transmitted pulse representing a binary symbol 1 or 0.

Further, to transmit a message signal (either analog or digital) over a band-pass communication channel, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Correspondingly, the receiver is required to re-create the original message signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several message sources over a common channel. Also, modulation may be used to convert the message signal into a form less susceptible to noise and interference.

Typically, in propagating through a channel, the transmitted signal is distorted because of nonlinearities and imperfections in the frequency response of the channel. Other sources of degradation are noise and interference picked up by the signal during the course of transmission through the channel. Noise and distortion constitute two basic limitations in the design of communication systems.

There are various sources of noise, internal as well as external to the system. Although noise is random in nature, it may be described in terms of its statistical properties such as the average power or the spectral distribution of the average power.

In any communication system, there are two primary communication resources to be employed, namely, average transmitted power and channel bandwidth. The average transmitted power is the average power of the transmitted signal. The channel bandwidth defines the range of frequencies that the channel can handle for the transmission of signals with satisfactory fidelity. A general system design objective is to use these two resources as efficiently as possible. In most channels, one resource may be considered more important than the other. Hence, we may also classify communication channels as power-limited or band-limited. For example, the telephone circuit is a typical band-limited channel, whereas a deep-space communication link or a satellite channel is typically power-limited.

The transmitted power is important because, for a receiver of prescribed noise figure, it determines the allowable separation between the transmitter and receiver. In other words, for a receiver of prescribed noise figure and a prescribed distance between it and the transmitter, the available transmitted power determines the signal-to-noise ratio at the receiver input. This, subsequently, determines the noise performance of the receiver. Unless performance exceeds a certain design level, the transmission of message signals over the channel is not considered to be satisfactory.

Additionally, channel bandwidth is important because, for a prescribed band of frequencies characterizing a message signal, the channel bandwidth determines the number of such message signals that can be multiplexed over the channel. In other words, for a prescribed number of independent message signals that have to share a common channel, the channel bandwidth determines the band of frequencies that may be allotted to the transmission of each message signal without discernible distortion.

For spread spectrum communication systems, these areas of concern have been optimized in one particular manner. In spread spectrum systems, a modulation technique is utilized in which a transmitted signal is spread over a wide frequency band. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. A spread spectrum system, on the other hand, often takes a baseband signal (e.g., a voice channel) with a bandwidth of only a few kilohertz, and distributes it over a band that may be many megahertz wide. This is accomplished by modulating with the information to be sent and with a wideband encoding signal. Through the use of spread spectrum modulation, a message signal may be transmitted in a channel in which the noise power is higher than the signal power. The modulation and demodulation of the message signal provides a signal-to-noise gain which enables the recovery of the message signal from a noisy channel. The greater the signal-to-noise ratio for a given system equates to: (1) the smaller the bandwidth required to transmit a message signal with a low rate of error or (2) the lower the average transmitted power required to transmit a message signal with a low rate of error over a given bandwidth.

Three general types of spread spectrum communication techniques exist, including:

The modulation of a carrier by a digital code sequence whose bit rate is much higher than the information signal bandwidth. Such systems are referred to as "direct sequence" modulated systems.

Carrier frequency shifting in discrete increments in a pattern dictated by a code sequence. These systems are called "frequency hoppers". The transmitter jumps from frequency to frequency within some predetermined set; the order of frequency usage is determined by a code sequence. Similarly "time hopping" and "time-frequency hopping" have times of transmission which are regulated by a code sequence.

Pulse-FM or "chirp" modulation in which a carrier is swept over a wide band during a given pulse interval.

Information (i.e. the message signal) can be embedded in the spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code, typically a binary code, involves module-2 addition. Alternatively, the information or message signal may be used to modulate a carrier before spreading it.

Thus, a spread spectrum system must have two properties: (1) the transmitted bandwidth should be much greater than the bandwidth or rate of the information being sent, and (2) some function other than the information being sent is employed to determine the resulting modulated channel bandwidth.

The essence of the spread spectrum communication involves the art of expanding the bandwidth of a signal, transmitting the expanded signal and recovering the desired signal by remapping the received spread spectrum into the original information bandwidth. Furthermore, in the process of carrying out this series of bandwidth trades, the purpose of spread spectrum techniques is to allow the system to deliver error-free information in a noisy signal environment.

The present invention enhances the ability of spread-spectrum systems and, in particular, code division multiple access (CDMA) cellular radio-telephone systems to recover spread spectrum signals from a noisy radio communication channel. In CDMA cellular radio-telephone systems, the "users" are on the same frequency and separated only by unique user codes. The noise interference level in the communication channel is directly related to the interference level created by the users and not by additive Gaussian noise like in other communication systems. Thus, the number of users that can simultaneously use the same frequency band in a given cellular region is limited by the code noise of all active "users". The present invention reduces the effects of undesired user code noise and thus significantly increases the number of users which can simultaneously be serviced by a given cellular region.

SUMMARY OF THE INVENTION

A spread-spectrum noise canceller is provided for cancelling user code noise from a spread-spectrum communication channel. The spread-spectrum noise canceller includes a receiver for receiving a spread-spectrum signal including a first and at least a second signal as well as a noise canceller operatively coupled to the receiver for reducing spread-spectrum noise in the first received signal by substantially processing the at least second received signal out of the received spread-spectrum signal.

In addition a method is provided which cancels user code noise from a spread-spectrum communication channel. The method includes for receiving a spread-spectrum signal including a first and at least a second signal and subsequently reducing spread-spectrum noise in the first received signal by substantially processing the at least second received signal out of the received spread-spectrum signal.

DETAILED DESCRIPTION

Figure 1:
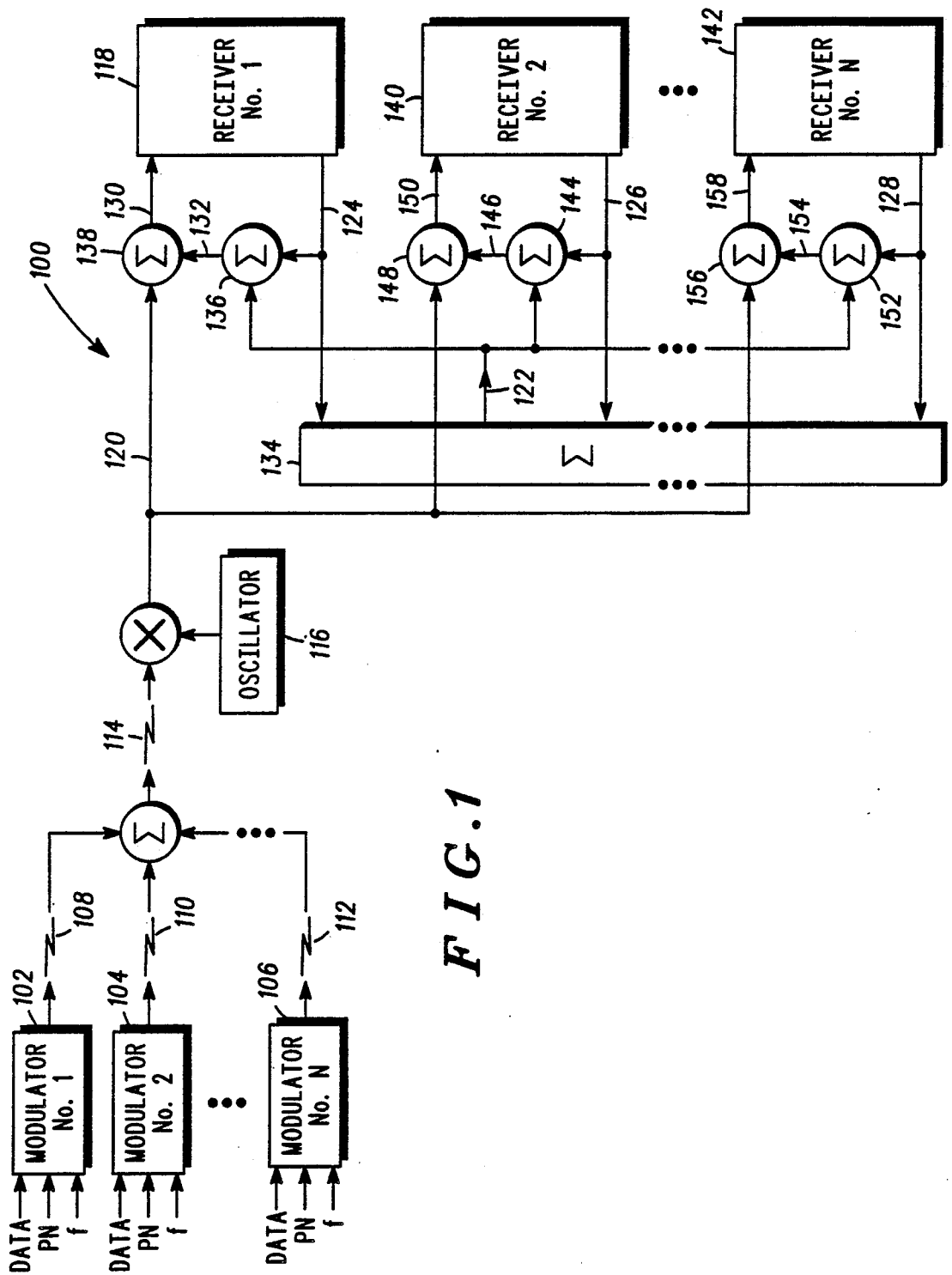
FIG. 1 is a diagram showing a preferred embodiment user-to-base communication network link with a spread spectrum noise canceller.

Referring now to FIG. 1, a diagram is shown of a preferred embodiment user-to-base communication network link with a spread spectrum noise canceller. The noise canceller utilizes the base communication network or user's knowledge of the receiver signals. By knowing the data, spreading code, and carrier phase of each received signal, the interference caused by undesired signals can be cancelled, thereby leaving only additive noise in a particular desired received signal. When this is implemented in a base communication network unit (e.g., base station), several advantageous results can be realized by the communication network. These advantages include: removing or reducing spreading code interference from the received signal, increasing the number of users on a particular CDMA communication channel due to increased capability of the base station to handle in the communication channel, and enabling the use of smaller handheld user radio communication units because user transmitter power is required when the interfering CDMA code noise is cancelled at the base station.

In the one preferred embodiment, as shown in FIG. 1, the base station 100 demodulates strong spread spectrum signals from the communication channel in a particular cell site. The base station 100 determines or knows from previously-stored information in the base station 100 the carrier phase, PN spreading code, and data for each user. This means that total knowledge is available at the base station 100 about each of the received signals and thus cancellation of each of the received signals from a particular received signal can be achieved. Even though base station 100 demodulates strong spread spectrum signals from the CDMA communication channel, a certain amount of weak spread spectrum signals from adjacent cells will exist in the communication channel. These weak spread spectrum signals will add to the total noise in the communication channel of the particular cell site being demodulated by the base station 100.

In the preferred embodiment, the modulation scheme of the signals is assumed to be quadrature phase shift keying (QPSK). However, it will be appreciated by those skilled in the art that other modulation techniques can be used without departing from the teachings of the present invention. The modulators 102, 104 and 106 represent N number of modulators of N users of a communication link from the modulators 102, 104 and 106 to base station 100. The modulators 102, 104 and 106 generate spread spectrum signals 108, 110 and 112 which, when added together, form a significant portion of the spread spectrum signal found in the communication channel 114. The composite of spread spectrum signals in the communication channel 114 are received by the base station 100. In the preferred embodiment, the communication channel 114 for cellular communication system is in the 900 MHz region of the electromagnetic spectrum. However, other regions of the electromagnetic spectrum may be used without departing from the teachings of the present invention. In order to simplify hardware of the receivers in the base station 100, the composite received signal is converted to a signal 120 at a frequency of about 10 MHz by an oscillator 116. This conversion of the received composite spread spectrum signal 114 enables the remaining receiver components to be implemented in a digital form. It will be appreciated by those skilled in the art that the following techniques could also be adapted for use on analog signals.

Referring more particularly to a first receiver 118, first receiver 118 generates an estimated signal 124 of the spread spectrum signal 108 transmitted by the first modulator 102. This first estimated signal 124 preferably is derived from a composite estimated signal 122 of N estimated signals, the digitally-compatible signal 120 form of received composite spread spectrum signal 114, and the first estimated signal 124 itself. Composite estimated signal 122 is formed by summing with an arithmetic unit 134 the estimated signals 124, 126 and 128 generated by first receiver 118, second receiver 140 and N receiver 142, respectively. Composite estimated signal 122 is similar to the digital received composite signal 120 except for the additive noise and weak signals from adjacent cells in the communication system. More specifically, the difference between the composite estimated signal 122 and the digital received composite signal 120 is that the digital received composite signal 120 includes non-deterministic noise consisting of two components. The two components to the non-deterministic noise are:

All of the CDMA spread spectrum signals which are not being demodulated by the base station 100. These consist of a large number of low-level interfering users using the same communication channel as the base station 100 which are in nearby cells.

Receiver front end noise. By design, additive noise preferably is below the composite spread spectrum signal 114 when the communication channel is operating at full capacity.

First estimated signal 124 is subtracted with an arithmetic unit 136 from the composite estimated signal 122 to form a first estimated interference signal 132. This first estimated interference signal 132 is subtracted with an arithmetic unit 138 from the digital received composite signal 120 to form a first approximate signal 130. The first approximate signal 130 is provided to receiver 118 so that the first estimated signal 124 can be generated.

Similarly, a second receiver 140 generates an estimated signal 126 of the spread spectrum signal 110 transmitted by the second modulator 104. This second estimated signal 126 preferably is derived from the composite estimated signal 122 of N estimated signals, the digital received composite signal 120, and the second estimated signal 126 itself. Second estimated signal 126 is subtracted with an arithmetic unit 144 from the composite estimated signal 122 to form a second estimated interference signal 146. This second estimated interference signal 146 is subtracted with an arithmetic unit 148 from the digital received composite signal 120 to form a second approximate signal 150. The second approximate signal 150 is provided to receiver 140 so that the second estimated signal 126 can be generated.

Similarly, an Nth receiver 142 generates an estimated signal 128 of the spread spectrum signal 112 transmitted by the Nth modulator 106. This Nth estimated signal 128 preferably is derived from the composite estimated signal 122 of N estimated signals, the digital received composite signal 120, and the Nth estimated signal 128 itself. Nth estimated signal 128 is subtracted with an arithmetic unit 152 from the composite estimated signal 122 to form an Nth estimated interference signal 154. This Nth estimated interference signal 154 is subtracted with an arithmetic unit 156 from the digital received composite signal 120 to form an Nth approximate signal 158. The Nth approximate signal 158 is provided to receiver 142 so that the Nth estimated signal 128 can be generated.

Figure 2:
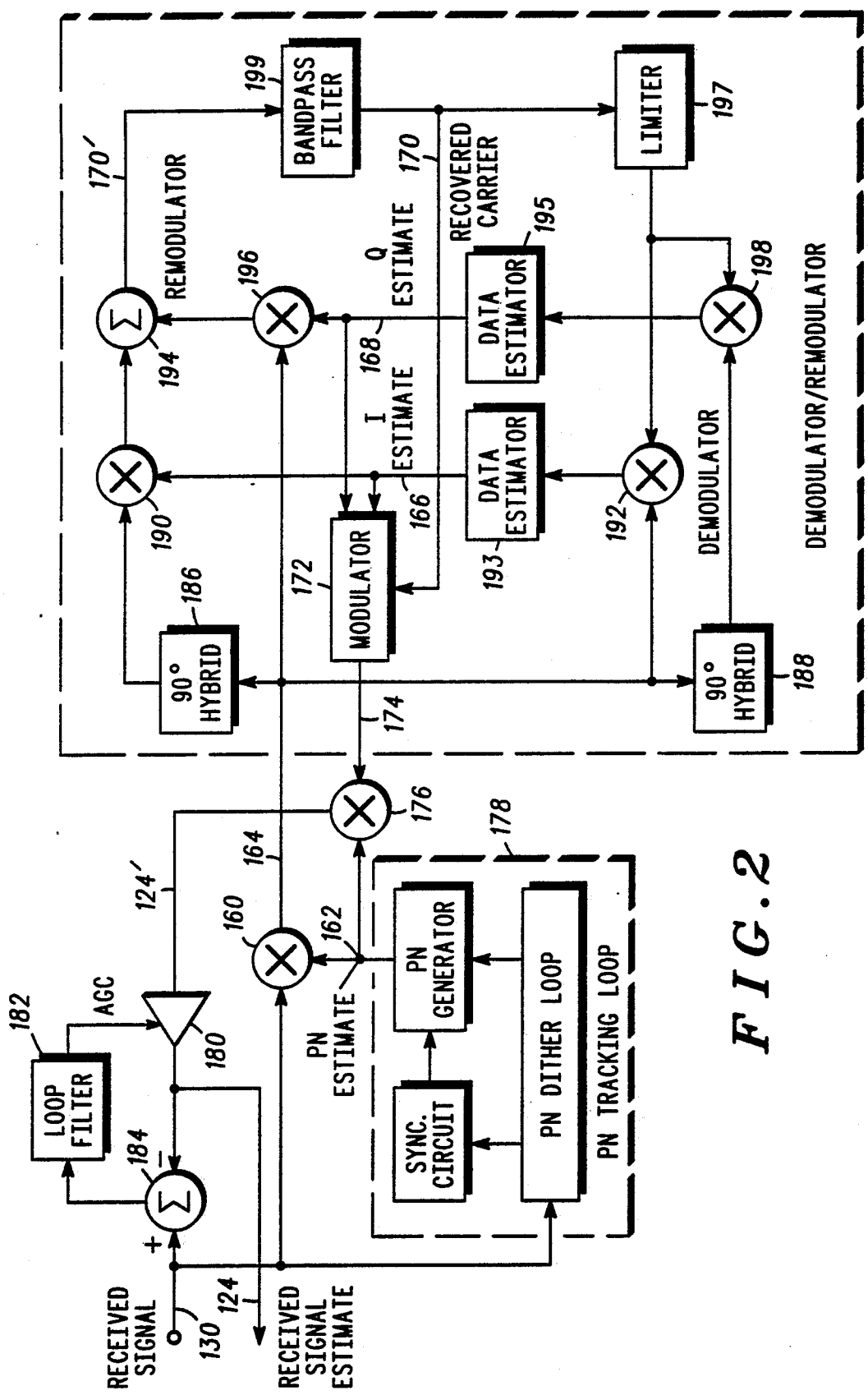
FIG. 2 is a diagram showing a preferred embodiment internal structure of a receiver for use in the user-to-base communication network link spread spectrum noise canceller.

FIG. 2 shows a diagram of a preferred embodiment internal structure of the first receiver 118 for use in the user-to-base-station communication network link spread spectrum noise canceller. It will be appreciated by those skilled in the art that other techniques of receiving a signal and generating and estimate signal may be used. The following description provides details of one techniques which may be used to accomplish the generation of an estimated signal in a receiver. Each of the N receivers preferably is configured to operate in a similar manner.

The first approximate signal 130 is mixed by a mixer 160 with the "PN estimate" 162 of the first modulator 102 PN spreading code which strips off the spreading code to form a QPSK signal 164. The despread signal 164 is a QPSK modulated signal. The QPSK signal 164 is demodulated with a demodulate/remodulate loop which generates data estimations of I signal 166 and Q signal 168 components of the QPSK signal 164 as well as a recovered carrier 170.

A QPSK remodulator is formed from 90 degree hybrid 186, mixers 190 and 196 and arithmetic unit 194. Signal 164 is operated on by 90 degree hybrid 186 to form a modified signal 164 which is provided to mixer 190. An unmodified signal 164 is provided to mixer 196. The in phase (I) and quadrature (Q) data is removed from the signals 164 provided to mixers 190 and 196, respectively. The output signals of mixers 190 and 196 are summed together by arithmetic unit 194 to produce a recovered carrier 170' which is free of data. This recovered carrier 170' is bandpass filtered by filter 199 to reduce the noise on the recovered carrier 170' to form recovered carrier 170.

A QPSK demodulator is formed from 90 degree hybrid 188, mixers 192 and 198, limiter 197 and data estimators 193 and 195. Limiter 197 hard limits recovered carrier 170. Signal 164 is mixed with hard limited carrier 170 by mixer 192. The output signal of mixer 192 is a noisy replica of the I data and is passed through a data estimator 193 to generate a data signal 166 estimation of I. Signal 164 is operated on by 90 degree hybrid 188 to form a modified signal 164 which is provided to mixer 198. The modified signal 164 is mixed with hard limited carrier 170 by mixer 198. The output signal of mixer 198 is a noisy replica of the Q data and is passed through a data estimator 195 to generate a data signal 168 estimation of Q.

The data estimations of I signal 166 and Q signal 168 modulate recovered carrier 170 with a modulator 172 to form a modulated QPSK signal 174. Modulated QPSK signal 174 is mixed by a mixer 176 with the PN spreading code estimate 162 generated by PN tracking loop 178 to form the first estimate signal 124'. The first estimate signal 124' is amplified by an amplifier 180 and subtracted from the first approximate signal 130 by an arithmetic unit 184 to generate an error signal for feedback to a feedback network with a filter 182. The filtered error signal is provided to amplifier 180 as a gain control signal. Amplifier 180, arithmetic unit 184 and filter 182 form an automatic gain control loop. The signal output by the amplifier 180 is the first estimate signal 124.

Although the discussion of FIGS. 1 and 2 relates to the communication link from modulators of user units to base stations, the user units can similarly use the above-discussed techniques to cancel the strong pilot signals from the base station from the weak user signal in the base-station-to-user unit communication link.

Figure 3:
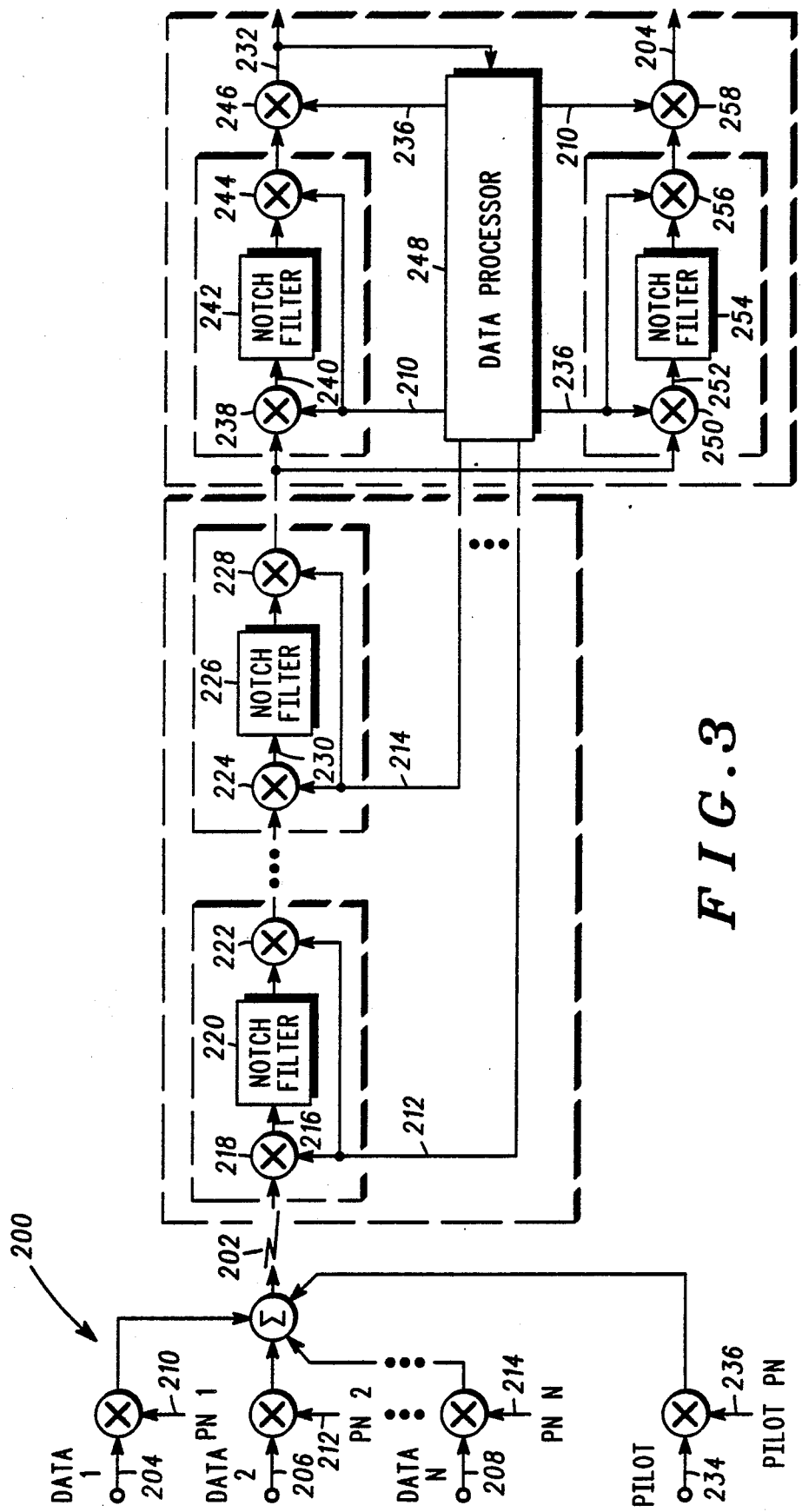
FIG. 3 is a diagram showing a preferred embodiment base-to-user communication network link with a spread spectrum noise canceller.

An alternative embodiment of the present invention is shown in FIG. 3. FIG. 3 shows a diagram of a preferred embodiment base-station-to-user communication network link with a spread spectrum noise canceller. The noise canceller utilizes the two constants in CDMA spread spectrum communication systems. These two constants are:

Each user unit is locked to a pilot signal or multiple pilot signals.

Each interfering user unit and pilot PN spreading code is known and has a fixed timing relation which is established at a base station and is defined on the pilot channel carrying the pilot signals.

By knowing these two constants, the interference caused by undesired signals in the base-station-to-user-unit communication link can be cancelled in a particular desired received signal. When this is implemented in user units, several advantageous results can be realized by the communication network. These advantages include: removing or reducing undesired and pilot spreading code interference from the received signal and increasing the number of users on a particular CDMA communication channel due to the increased capability of the user units to handle interference in the communication channel.

Composite spread spectrum signal 202 preferably consists of the sum of user data 204, 206 and 208 from first, second through Nth users which is spread by PN codes 210, 212 and 214, respectively, associated with each user and a pilot signal derived from pilot data 234 spread by pilot PN code 236. The undesired interfering signals are removed form the desired user signal by removing them one at a time. For example, in the case of the desired signal being a first spread spectrum signal derived from user data 204 from a first user, the second interferer (i.e. the second spread spectrum signal derived from user data 206 from a second user) is removed from the composite spread spectrum signal 202 by spreading, through the use of a mixer 218, the composite signal 202 with the spreading code 212 associated with the second user to form a second despread signal 216. The second despread signal 216 has several components, including user data 206 which is despread because of the spreading operation of mixer 218. A narrow band filter 220 preferably is used to notch user data 206 out of the second despread signal 216, thereby leaving the other spread spectrum user signals in the second despread signal minus that portion notched out by the filter 220. By spreading, through the use of a mixer 222, the remaining despread signal 216 with the spreading code 212, the composite signal is restored without the second user data 206 and the slight loss of other signals notched out by filter 220.

This removal operation is repeated for each of the remaining N known interferers until the only signals remaining in the composite signal 202 are the desired first spread spectrum signal and the pilot signal. In removing the Nth spread spectrum signal derived from user data 208 from an Nth user, the Nth signal is removed from the composite spread spectrum signal 202 by spreading, through the use of a mixer 224, the remaining composite signal 202 with the spreading code 214 associated with the Nth user to form an Nth despread signal 230. The Nth despread signal 230 has several components including user data 208 which is despread because of the spreading operation of mixer 224. A narrow band filter 226 preferably is used to notch user data 208 out of the Nth despread signal 230, thereby leaving the other spread spectrum user signals in the Nth despread signal minus that portion notched out by the filter 226. By spreading, through the use of a mixer 228, the remaining despread signal 230 with the spreading code 214, the composite signal is restored without the Nth user data 208 and the slight loss of other signals notched out by filter 226.

The above removal operations are enabled by first locking the pilot signal, thereby allowing the processing of the pilot signal to recover information about all of the user codes. Such information can be used to cancel the corresponding interferers. The cancelling operation in the alternative embodiment of the present invention can be performed in the IF or baseband frequencies.

After serially removing the undersired user spread spectrum signals, the composite signal 202 consists predominantly of the desired first user spread spectrum signal and the pilot signal. The pilot data 232 can be derived from the remaining composite signal 202 by removing the desired first user spread spectrum signal from the remaining spread spectrum 202 and spreading the subsequently remaining signal with the pilot PN spreading code 236. In removing the first user spread spectrum signal derived from user data 204 from a first user, the first signal is removed from the remaining composite spread spectrum signal 202 by spreading, through the use of a mixer 238, the remaining composite signal 202 with the spreading code 210 associated with the first user to form a first despread signal 240. The first despread signal 240 has several components including user data 204 which is despread because of the spreading operation of mixer 238. A narrow band filter 242 preferably is used to notch user data 204 out of the first despread signal 240, thereby leaving the other spread spectrum user signals in the first despread signal minus that portion notched out by the filter 242. By spreading, through the use of a mixer 244, the remaining despread signal 240 with the spreading code 210, the composite signal is restored without the first user data 204 and the slight loss of other signals notched out by filter 242. Subsequently, the pilot data 232 can be derived from the remaining composite signal 202 by spreading, through the use of a mixer 246, the remaining composite signal 202 with the pilot spreading code 236. The pilot data is provided to a data processor 248 so that the user PN spreading codes can be provided to each stage of the noise canceller as needed.

Similarly, the first user data 204 can be derived from the remaining composite signal 202 by removing the pilot spread spectrum signal from the remaining spread spectrum 202 and spreading the subsequently remaining signal with the first user PN spreading code 210. In removing the pilot spread spectrum signal derived from pilot data 234, the pilot signal is removed from the remaining composite spread spectrum signal 202 by spreading, through the use of a mixer 250, the remaining composite signal 202 with the spreading code 236 associated with the pilot signal to form an pilot despread signal 252. The pilot despread signal 252 has several components including pilot data 234 which is despread because of the spreading operation of mixer 250. A narrow band filter 254 preferably is used to notch pilot data 234 out of the pilot despread signal 252, thereby leaving the first user spread spectrum signal in the pilot despread signal minus that portion notched out by the filter 254. By spreading, through the use of a mixer 256, the remaining despread signal 252 with the spreading code 236, the composite signal is restored without the pilot user data 234 and the slight loss of other signals notched out by filter 254. Subsequently, the first user data 204 can be derived from the remaining composite signal 202 by spreading, through the use of a mixer 258, the remaining composite signal 202 with the first user spreading code 210.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A spread-spectrum noise canceller, comprising:
   (a) receiving means for receiving a spread-spectrum signal including a first and at least a second signal; and
   (b) noise cancelling means operatively coupled to the receiving means for reducing spread-spectrum noise in the first received signal by substantially processing the at least second received signal out of the received spread-spectrum signal through the use of a spreading code associated with the at least second received signal.

2. A spread-spectrum noise canceller, comprising:
   (a) receiving means for receiving a spread-spectrum signal, generating a first estimated signal from a first input signal by utilizing a first spreading code, and generating a second estimated signal from a second input signal by utilizing a second spreading code; and
   (b) noise cancelling means operatively coupled to the receiving means for reducing spread-spectrum noise in the received spread-spectrum signal by:
      (i) generating the first input signal as a function of the first estimated signal, the second estimated signal and the spread-spectrum signal; and
      (ii) generating the second input signal as a function of the first estimated signal, the second estimated signal and the spread-spectrum signal.

3. A spread-spectrum noise canceller, comprising:
   (a) receiving means for receiving a spread-spectrum signal;
   (b) first receiver means for despreading a first input signal with a first spreading code, generating a first estimated signal of the despread first input signal, and spreading the first estimated signal with the first spreading code;
   (c) second receiver means for despreading a second input signal with a second spreading code, generating a second estimated signal of the despread second input signal, and spreading the second estimated signal with the second spreading code; and
   (d) noise cancelling means operatively coupled to the receiving means, the first receiver means and the second receiver means for reducing spread-spectrum noise in the received spread-spectrum signal by:
      (i) generating a composite estimate signal by summing the first and second estimated spread-spectrum signals;
      (ii) generating a first interference signal by subtracting the first estimated spread-spectrum signal from the composite estimate signal and subsequently generating the first input signal by subtracting the first interference signal from the spread-spectrum signal received by the receiving means; and (iii) generating a second interference signal by subtracting the second estimated spread-spectrum signal from the composite estimate signal and subsequently generating the second input signal by subtracting the second interference signal from the spread-spectrum signal received by the receiving means.

4. The spread-spectrum noise canceller of claim 3 wherein the receiving means comprises conversion means for converting the spread-spectrum signal from a first frequency range to a second frequency range, the second frequency range being such that the received signal can be manipulated digitally.

5. A method for cancelling spread-spectrum noise, comprising:
   (a) receiving a spread-spectrum signal;
   (b) generating a first estimated signal from a first input signal by utilizing a first spreading code;
   (c) generating a second estimated signal from a second input signal by utilizing a second spreading code;
   (d) reducing spread-spectrum noise in the received spread-spectrum signal by:
      (i) generating the first input signal as a function of the first estimated signal, the second estimated signal and the spread-spectrum signal; and
      (ii) generating the second input signal as a function of the first estimated signal, the second estimated signal and the spread-spectrum signal.

6. A method for cancelling spread-spectrum noise, comprising:
   (a) receiving a spread-spectrum signal;
   (b) generating a first estimated signal by:
      (i) despreading a first input signal with a first spreading code;
      (ii) estimating a first estimated signal of the despread first input signal; and
      (iii) spreading the first estimated signal with the first spreading code;
   (c) generating a second estimated signal by:
      (i) despreading a second input signal with a second spreading code;
      (ii) estimating a second estimated signal of the despread second input signal; and
      (iii) spreading the second estimated signal with the second spreading code; and
   (d) reducing spread-spectrum noise in the received spread-spectrum signal by:
      (i) generating a composite estimate signal by summing the first and second estimated spread-spectrum signals;
      (ii) generating a first interference signal by subtracting the first estimated spread-spectrum signal from the composite estimate signal and subsequently generating the first input signal by subtracting the first interference signal from the spread-spectrum signal; and
      (iii) generating a second interference signal by subtracting the second estimated spread-spectrum signal from the composite estimate signal and subsequently generating the second input signal by subtracting the second interference signal from the spread-spectrum signal.

7. A spread-spectrum noise canceller, comprising:
   (a) receiving means for receiving a spread-spectrum signal including a user spreading code and a control spreading code; and
   (b) noise cancelling means operatively coupled to the receiving means for reducing spread-spectrum noise in the received spread-spectrum signal by:
      (ii) generating control data by processing a user signal out of the received spread-spectrum signal and subsequently spreading remaining spread-spectrum signal with the control spreading code; and
      (iii) generating user data by processing a control signal out of the received spread-spectrum signal and subsequently spreading remaining spread-spectrum signal with the user spreading code.

8. A spread-spectrum noise canceller, comprising:
   (a) receiving means for receiving a spread-spectrum signal including a control signal and a plurality of user signals;
   (b) processing means operatively coupled to the receiving means for determining at least a first spreading code, second spreading code and a control spreading code from the received spread-spectrum signal; and
   (c) noise cancelling means operatively coupled to the receiving means and the processing means for removing spread-spectrum noise from the received signal by:
      (i) removing a second user signal by despreading the received spread-spectrum signal with the second spreading code, processing the second user signal out of the received spread-spectrum signal, and generating a reduced noise signal by spreading the remaining spread-spectrum signal with the second spreading code;
      (ii) generating control data by despreading the reduced noise signal with the first spreading code, processing the first user signal out of the received spread-spectrum signal, and spreading the remaining spread-spectrum signal with the first spreading code and subsequently the control spreading code; and
      (iii) generating first user data by despreading the reduced noise signal with the control spreading code, processing the control signal out of the received spread-spectrum signal, and spreading the remaining spread-spectrum signal with the control spreading code and subsequently the first spreading code.

9. A method of cancelling spread-spectrum noise, comprising:
   (a) receiving a spread-spectrum signal including a user spreading code and a control spreading code; and
   (b) removing spread-spectrum noise from the received signal by:
      (i) generating control data by processing a user signal out of the received spread-spectrum signal and subsequently spreading remaining spread-spectrum signal with the control spreading code; and
      (ii) generating user data by processing a control signal out of the received spread-spectrum signal and subsequently spreading remaining spread-spectrum signal with the user spreading code.

10. A method of cancelling spread-spectrum noise, comprising:
    (a) receiving a spread-spectrum signal including a control signal and a plurality of user signals;

(b) determining at least a first spreading code, second spreading code and a control spreading code from the received spread-spectrum signal; and (c) removing spread-spectrum noise from the received signal by:
  (i) removing a second user signal by despreading the received spread-spectrum signal with the second spreading code, processing the second user signal out of the received spread-spectrum signal, and generating a reduced noise signal by spreading the remaining spread-spectrum signal with the second spreading code;
  (ii) generating control data by despreading the reduced noise signal with the first spreading code, processing the first user signal out of the received spread-spectrum signal, and spreading the remaining spread-spectrum signal with the first spreading code and subsequently the control spreading code; and
  (iii) generating first user data by despreading the reduced noise signal with the control spreading code, processing the control signal out of the received spread-spectrum signal, and spreading the remaining spread-spectrum signal with the control spreading code and subsequently the first spreading code.

* * * * *